Jan. 22, 1952     O. J. MOEHLER     2,583,386
SEPARABLE SLIDE FASTENER
Filed March 28, 1945     2 SHEETS—SHEET 1
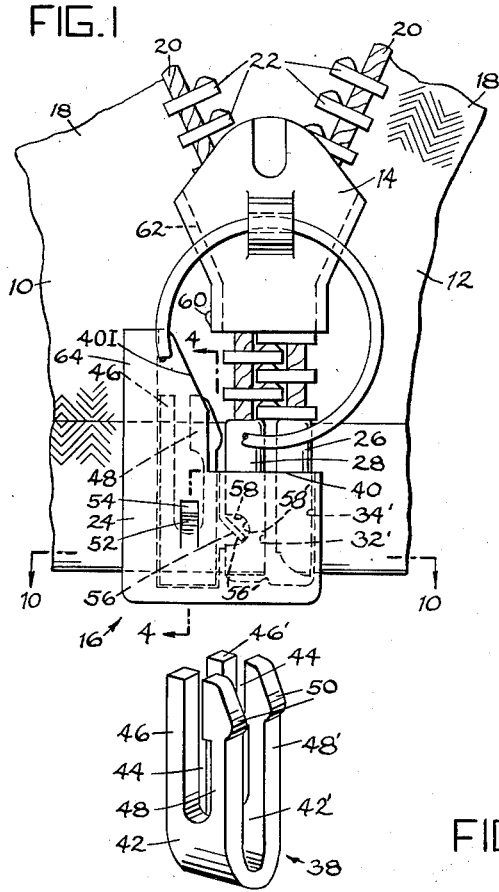
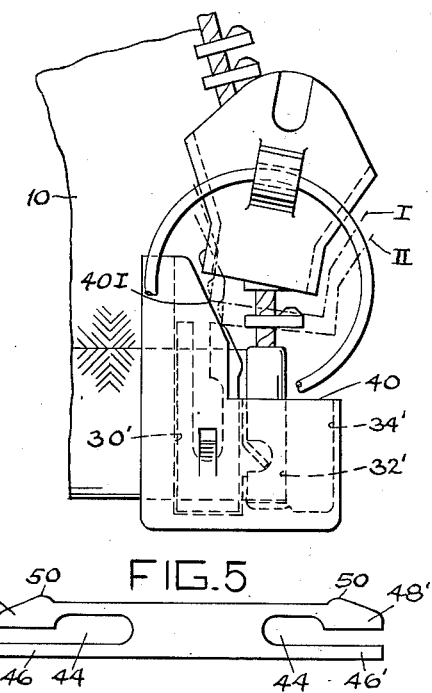
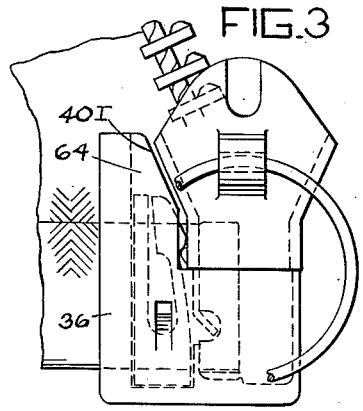
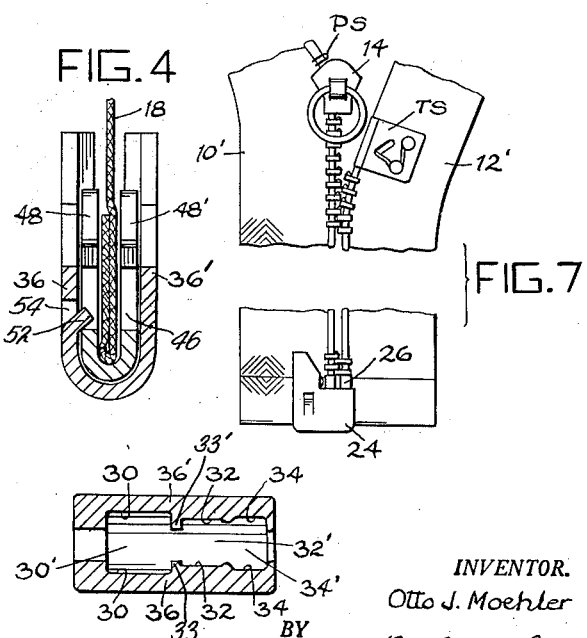
INVENTOR.
Otto J. Moehler
BY Richard Low
AGENT Jan. 22, 1952      O. J. MOEHLER      2,583,386
SEPARABLE SLIDE FASTENER Filed March 28, 1945      2 SHEETS—SHEET 2

INVENTOR.
Otto J. Moehler
BY Richard Low
AGENT

Patented Jan. 22, 1952

2,583,386

UNITED STATES PATENT OFFICE 2,583,386

SEPARABLE SLIDE FASTENER

Otto J. Moehler, Newark, N. J., assignor to Conmar Products Corporation, Newark, N. J., a corporation of New Jersey Application March 28, 1945, Serial No. 585,296

21 Claims. (Cl. 24—205.11)

This invention relates to slide fasteners which can be separated at both ends. More particularly, it relates to a separable end connection for such slide fasteners.

Separable end connections for fully separable slide fasteners are usually made to comprise substantially two members each being secured to one end of a slide fastener stringer and adapted to cooperate with the other. Broadly speaking, one member represents a female part, while the other of the two members represents a male part. In the most popular form of separable end connection, the member which is frequently called "clip" is formed to have a socket and the other member is formed as a pin, the socket being so dimensioned as to receive the pin.

When the two members of a separable end connection are connected and the slide fastener is closed, the slider has to be moved in the opening direction into the end position in order that said members may be disconnected. In order that disconnected members be connected the slider has to be in the same end position. In the aforesaid clip-and-pin type, the pin is inserted into the clip through the slider and removed from same also through the slider. Since there are two end positions to which a slider, when mounted on a slide fastener, may be moved, the end position herein referred to will hereinafter be called "lowest position" or "lowermost position." This term, however, should not be understood in a limiting sense. Similarly, the respective end of the stringers will be called "lower end" or "bottom end," and the separable end connection herein disclosed and described will be called "separable bottom stop."

A disadvantage of prior constructions is that, after the two stringers of a slide fastener have been separated, the slider, while dependent from one stringer, is allowed to freely move away from the lowermost position. This necessitates the bringing of the slider back into this position before the two members of the separable end connection can be reengaged. A number of suggestions has been made to provide separable bottom stops having means for retaining the slider against unwanted displacement from the lowermost position. However, these suggestions have not proved satisfactory. The prime object of my invention is to provide a slide fastener having on the stringer, which is equipped with the female member of a separable end connection, improved means for retaining the slider against accidental displacement from the lowermost position.

A more specific object of this invention is to provide the female member of a separable end connection with means to retain the slider in the lowermost position.

In one of the prior suggestions the action of the retaining means depends on the resiliency of the curved end of a slide fastener stringer, which action is not reliable. It is an object of this invention to provide a female member having inherently resilient means to retain the slider in the lowermost position.

In one of the suggested separable bottom stops a female member is provided with a yielding portion. Yet this portion is exposed and hence liable to be injured and to damage any extraneous materials. It is another object of my present invention to provide a female member in which the slider retaining means are concealed.

One suggestion has been made to provide slider retaining means in which use is made of the resiliency of the slider wings. It is believed that slider wings are not resilient enough as to ensure proper operation. Another prior suggestion uses a rigid latching element which is normally urged into the coupling position and is uncoupled by the insertion of the pin. The devices according to the latter suggestion are complicated. Other objects of my invention, therefore, include the provision of a separable bottom stop in which means of soft springiness are used, and the parts of which are simple to manufacture, assemble and operate.

It has been noticed that when a slider, after separation of the stringers of a slide fastener, is moved to its lowermost position, care must be taken to bring the slider into the position where it is ready to have the pin inserted therethrough and into the socket of the clip. A still further object of this invention is to provide on the stringer carrying the socket-forming female member of a separable end connection means to guide the slider into the correct position for passing the male pin member therethrough.

For the accomplishment of the foregoing and such other objects as will hereinafter appear, my invention consists of the slide fastener and separable end connection elements and their relation one to the other, as hereinafter are more particularly described in the specification and sought to be defined in the claims. The specification is accompanied by drawings in which:

Fig. 1 is a plan view of a slide fastener equipped with a separable end connection embodying features of the present invention;

3

Fig. 2 is a view showing only one stringer of the slide fastener of Fig. 1;

Fig. 3 is a view similar to Fig. 2 showing the slider in a different position;

Fig. 4 is a section taken in the planes of the broken line 4—4 of Fig. 1;

Fig. 5 is a view of a blank prior to forming the spring used in the separable end connection shown in Figs. 1 to 3;

Fig. 6 is a perspective view of the finished spring;

Fig. 7 is a plan view of a slide fastener on a reduced scale, illustrating an application of the invention;

Fig. 10 is a section of the clip taken in the plane of the line 10—10 of Fig. 1;

Figure 11:
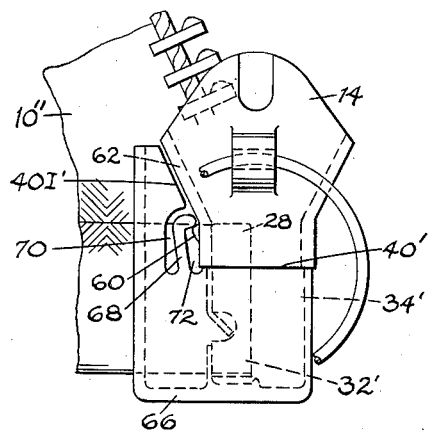
Fig. 11 is a plan view similar to Fig. 3 showing a modification of the invention.

Referring to the drawings in greater detail now and having reference first to Figs. 1 to 10, the slide fastener comprises two stringers 10 and 12, a slider 14, and a separable end connection generally designated 16. Each of the stringers 10 and 12 includes a fabric tape 18 and 18', respectively, each tape having a beaded edge 20 and fastener elements 22 spacedly mounted along the beaded edge. The body of the slider 14 comprises two spacedly united parallel walls having inturned side flanges. Thus, the slider 14 is of a conventional form as are the stringers 10 and 12, and it moves along the stringers to open or close the slide fastener. The separable end connection 16 comprises a female member, such as the clip 24, and a male member, such as the pin 26. The clip 24 is clamped around a stud 28 which stud is secured to the end of the beaded edge of the tape 18, whereas the pin is secured to the end of the beaded edge of the tape 18'.

In the particular form of the invention selected for illustration in Figs. 1 to 10, the clip 24 is formed as a triple-chambered body. It is preferably made of solid stock rolled to form three longitudinally extending channels 30, 32 and 34, and the rolled stock is severed into pieces (see Fig. 9) which are preliminarily bent to V-shape and, while these pieces are applied to the lower end of the stringer 10, they are bent to a final U-shape (see Figs. 4 and 10). Such a V-shaped piece of stock is secured to the lower end of the stringer 10 by clamping the walls 36 and 36' of said piece of stock against the stud 28, the stud being thereby received in the chamber 32' which in the finished clip is formed by the channel portions 32, 32 (see particularly Fig. 10). The flanking chambers 30' and 34', formed by the channel portions 30, 30 and 34, 34, respectively, serve to house a spring 38 and the pin 26, respectively. It will be clear from the drawing that the rolled stock is severed in a die to form pieces (see Fig. 9) which when bent to U-shape give clips, each of the two walls of a clip having an upper edge with a portion 40 extending transversely of the length of the slide fastener, and a portion 40I, the latter being inclined toward the former, best shown in Figs. 1 to 3.

In the exemplification of the invention illustrated in Figs. 1 to 10, the spring 38 is made of sheet metal by stamping (a stamped out piece is shown in Fig. 5) and bending (a finished piece is shown in Fig. 6). The finished spring 38 represents a U-shaped leaf spring the two legs 42, 42' of which are recessed as at 44, 44 and terminate in prongs 46, 46' and 48, 48'. When the prongs 48, 48' are deflected toward the prongs 46, 46', they tensionally tend to swing back into normal position. The prongs 48, 48' are provided with noses 50, 50 the purpose of which will be described hereinafter. The spring 38 is not only locked in place by means of the walls 36, 36' of the clip 24 but also by a barb 52 formed integrally with one clip wall as the front wall 36 and projecting through an aperture 54 in said front wall inwardly between the prongs 46 and 48.

While this is no feature of my invention it might nevertheless be mentioned that the clip 24 is secured to the respective tape by means of the walls 36 and 36' which grip the stud 28 and the tape and is additionally anchored by means of two barbs 56, 56' (see Fig. 1) formed integrally with the clip rails 33, 33' (see Fig. 10) and embedded in the tape at 58, 58' (apertures provided in the stud).

The function of the constructional form of the invention discussed hereinbefore is as follows: In order to separate the stringers 10 and 12 the slider 14 has to be moved to its lowermost position, that is, where the slider bears against and rests on the edges 40, 40 of the clip 24. The fastener elements have all been disengaged from one another, and the separation of the stringers is completed by the removal of the pin 26 from the clip 24 whereby the pin is pulled out through the slider. The assembly of the stringers 10 and 12 is done by inserting the pin 26 through the slider into the clip 24. For easy insertion of the pin it is necessary to have the slider in the same place as during the removal of the pin (lowermost position of the slider, clearly shown in Fig. 3).

According to the principles of this invention the slider is retained in the lowermost position due to cooperation of the noses 50, 50 of the spring 38 with projections 60, 60 provided on the outside of the flanges 62, 62 of the slider 14. In moving the slider to its lowermost position, the projections 60, 60 pass the noses 50, 50 which project into the path of the projections 60, 60 by deflecting the spring prongs 48, 48' toward the spring prongs 46, 46'. The prongs 48, 48' having thereafter moved back, the noses 50, 50 engage above the projections 60, 60 and consequently lock the slider against moving away from its lowermost position.

When the slider 14 moves over the fastener elements 16 of the assembled stringers 10 and 12, it is properly guided both by the engaged and disengaged fastener elements, the former passing through the straight stem of the interiorly formed and commonly known Y-shaped slider channel, the latter passing through the convergent branches of the Y. However, when the stringers are separated and the slider is not retained in its lowermost position, the slider is likely to become displaced as shown in Fig. 2. In accordance with the principles of the invention the slider, when dependent from the stringer 10, is guided to its proper lowermost position by means of the inclined clip edges 40I, 40I. These edges cam the slider on its downward movement into a position indicated by the dash-dotted line I, thence into a position indicated by the dash-dotted line II until it finally reaches the correct position shown in Fig. 3 in which position the slider rests on the edges 40, 40. The guiding means, in the constructional form of the invention just discussed, are formed itnegrally with the female member, that is, the clip 24. They consist in extensions 64, 64 of the clip walls 36, 36' which extensions are so shaped as to accommodate the widening sides of the slider.

The guiding means according to the invention prove to be particularly beneficial when used on a slide fastener as shown in Fig. 7. The slide fastener of Fig. 7 illustrates the so-called quick disassembly type which is disclosed and described in detail in the co-pending application of William Mikulas, Serial Number 504,414, filed September 30, 1943, Patent No. 2,381,359, granted August 7, 1945. A slide fastener of this type is fully separable, but can be opened from the top as well as from the bottom. The slider 14, when drawn in the closing direction to complete the closing of the slide fastener stringers 10' and 12', engages and is stopped by a temporary top stop TS. In order to quickly open the closed slide fastener a greater than normal force has to be exerted on the slider to cause it to move past the stop TS, whereupon the stringers are free to be separated by a stripping action from the top. The slider has definitely been stopped by a permanent top stop PS and retained on the stringer 10'. It will be understood that each such opening from the top necessitates the bringing of the slider down to the bottom along the stringer 10' in order to again assemble the stringer 10' with the stringer 12'. It is the purpose of the guiding means provided on the clip 24 to guide the slider while moving down along the stringer 10' to the correct position for insertion of the pin 26 secured to the stringer 12'.

In the embodiment of the invention shown in Fig. 11 a female member 66 is clamped around a stud 28 which in turn is secured to the end of the slide fastener stringer 10''. In describing the constructions of Figs. 11 to 16 the same references, but provided with indices, are used to indicate like parts. The female member 66 is a triple-chambered body, the central chamber 32' of which receives the stud 28 and the flanking chamber 34' of which is dimensioned to receive the pin of a stringer to be assembled with the stringer 10'' and which is not shown. The upper edges of the female member 66 is composed of the portions 40', 40' and inclined portions 40I', 40I'. The resilient means designed to cooperate with the projections 60, 60 provided on the flanges 62, 62 of the slider 14 consist of two springs 68, 68 integrally formed with the walls of the clip 66. The springs 68, 68 are made by providing recesses 70 and 72 in each of the clip walls. The free ends of the springs 68, 68 form hooks adapted to engage the projections 60, 60. In this connection it will be understood that the female member might just as well be formed as a two-chambered body inasmuch as no chamber is needed to accommodate the integrally formed springs 68, 68. It will also be understood that one spring 68 only could be provided to cooperate with a single projection 60.

Figure 12:
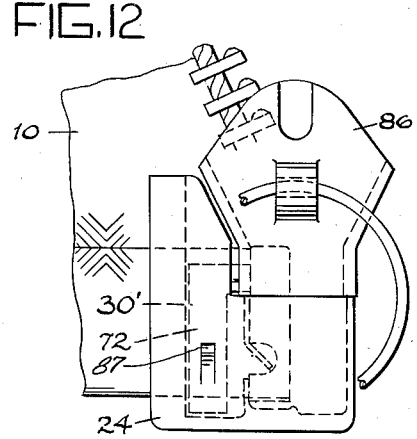
Fig. 12 is a plan view similar to Fig. 3 showing another modification.
Figure 8:
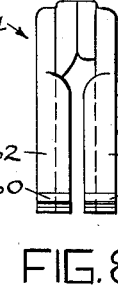
Fig. 8 is a side elevation of the slider of Figs. 1 to 3, this view showing the left-hand side.
Figure 13:
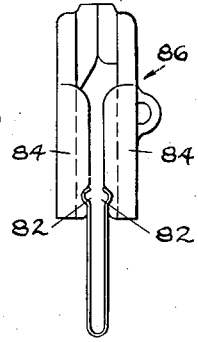
Fig. 13 is a side elevation of the slider and spring of Fig. 12, with all of the other parts omitted.
Figure 14:
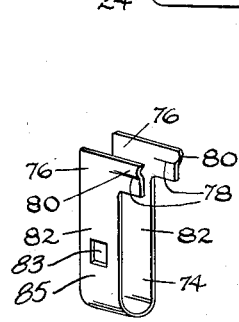
Fig. 14 is a perspective view of the spring of Figs. 12 and 13.

In the modification shown in Figs. 12 to 14, the chamber 30' of the female member 24 receives a member 74 which is U-shaped and the cross bars 76, 76 of which are recessed at 78, 78 and so shaped as to enable the resilient portions 80, 80 to cooperate with notches 82, 82 provided in the flanges 84, 84 of the slider 86. An aperture 83 in the leg 85 of the member 74 (Fig. 14) receives a barb 87 formed integrally with a wall of the clip 24. In moving the slider down to its lowermost position along the stringer 10, this position being illustrated in Figs. 12 and 13, the portions 80, 80 are deflected toward each other until they swing back to engage in the notches 82, 82 and thereby tensionally retain the slider in its lowest position.

Figures 9, 15:
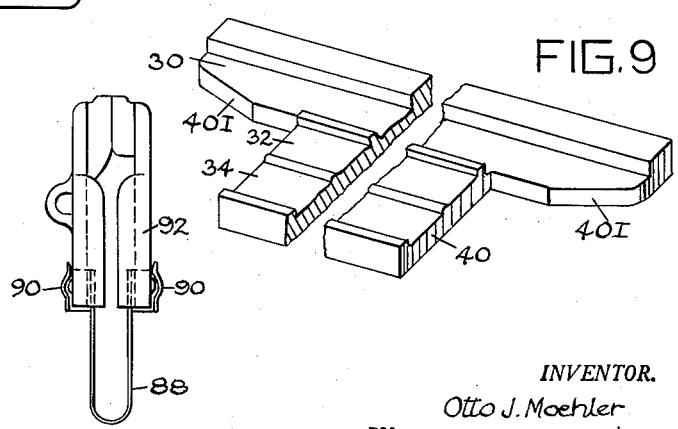
Fig. 9 is a perspective view of a piece of rolled stock being used for making a clip.

In the modification illustrated in Fig. 15 a spring 88 is used which when mounted in the female member of a separable bottom stop retains the slider in its lowermost position by holding it from the outside. The free ends 90, 90 of the U-shaped spring 88 are put under tension by the outer faces of the slider 92 and act in the manner indicated.

Figure 16:
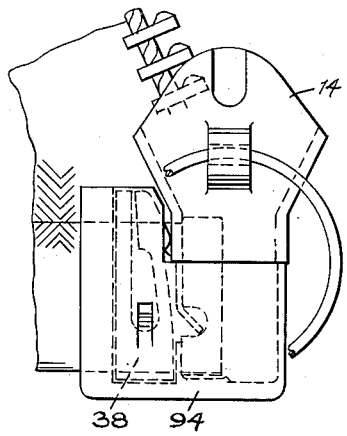
Figs. 15 and 16 illustrate further modifications of the invention.

While in the modifications shown in Figs. 1 to 15 a female member is employed which is so shaped as to provide guiding means for the slider to be brought in its correct lowermost position, the modification of Fig. 16 illustrates an exemplification of the invention wherein a female member 94 has no guiding means for the slider. The female member holds a spring such as 38, described with reference to Figs. 1 to 10.

In the lowermost position of the slider 14 according to the modification of Figs. 1 to 10, the flanges 62 of the slider are pressed against the stud 28 by means of the resilient means used. The slider is supported by the stud and held in place between the spring 38 and the stud 28. In the modifications respectively of Fig. 11 and Fig. 16, the slider is retained in its lowest position in a similar way. The action of the resilient means in the forms shown in Figs. 12 to 14 and Fig. 15, respectively, is different. In these forms two opposite parts of a spring tensionally engage the slider from the inside and outside, respectively.

It is believed that the arrangement and operation of my improved separable bottom stop, as well as the many advantages thereof, will be apparent from the foregoing detailed description. It will also be apparent that while I have shown and described my invention in preferred forms, changes and modifications may be made in the structure disclosed, without departing from the spirit of the invention defined in the following claims.

I claim:

1. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, the thickness of the clip in a direction perpendicular to the plane of the tapes being substantially the same as in a corresponding bottom stop not having a slider-holding spring, said housing and the integrally formed projecting means of the spring coming to a level higher than the socket so that the integrally formed projecting means of the spring can cooperate with the slider to hold it at the clip.

2. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, the thickness of the clip in a direction perpendicular to the plane of the tapes being substantially the same as in a corresponding bottom stop not having a slider-holding spring, said housing and the integrally formed projecting means of the spring coming to a level higher than the socket so that the integrally formed projecting means of the spring can cooperate with the slider to hold it at the clip, said slider having detent means cooperating with the slider-holding spring to more positively anchor the slider at the clip.

3. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, said housing and the integrally formed projecting means of the spring coming to a level higher than the socket so that the integrally formed projecting means of the spring can cooperate with the slider to hold it at the clip, said spring being bent in the form of a U around the lower end of the stringer with the arms of the U disposed on opposite sides of the stringer for cooperation with both wings of the slider.

4. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, said housing and the integrally formed projecting means of the spring coming to a level higher than the socket so that the integrally formed projecting means of the spring can cooperate with the slider to hold it at the clip, said spring being bent in the form of a U around the lower end of the stringer with the arms of the U disposed on opposite sides of the stringer for cooperation with both wings of the slider, the spring housing portion of said clip having means struck inwardly and engaging a part of the spring to fix the spring in the housing.

5. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring having an integral portion adapted to engage and releasably hold the slider, said clip having a socket formed at one side of the stud to receive the pin, and said clip having a housing at the opposite side of the stud to house said slider-holding spring, said housing and spring coming to a level higher than the socket so that the spring can cooperate with the slider to hold it at the clip, said clip consisting of a single piece of metal having three collateral channels and bent to U-shape, with the middle channel clamped on the stud, the outer channel acting as the aforesaid socket, and the other outer channel acting as the aforesaid housing.

6. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, the thickness of the clip in a direction perpendicular to the plane of the tapes being substantially the same as in a corresponding bottom stop not having a slider-holding spring, said housing and the integrally formed projecting means of the spring coming to a level higher than the socket so that the integrally formed projecting means of the spring can cooperate with the slider to hold it at the clip, the inner edge of the housing being shaped to conform to the adjacent outer edge of the slider and thereby acting as a guide for the slider.

7. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring having an integral portion adapted to engage and releasably hold the slider, said clip having a socket formed at one side of the stud to receive the pin, and said clip having a housing at the opposite side of the stud to house said slider-holding spring, said housing and spring coming to a level higher than the socket so that the spring can cooperate with the slider to hold it at the clip, said clip consisting of a single piece of metal having three collateral channels and bent to U-shape, with the middle channel clamped on the stud, the outer channel acting as the aforesaid socket, and the other outer channel acting as the aforesaid housing, the inner edge of the housing being shaped to conform to the adjacent outer edge of the slider and thereby acting as a guide for the slider.

8. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring provided with integrally formed projecting means for releasably retaining the slider, said clip having a socket formed at one side of the stud to receive the pin, and said clip having a housing at the opposite side of the stud to house said slider-holding spring, said housing and the integrally formed projecting means of the spring coming to a level higher than the socket so that the integrally formed projecting means of the spring can cooperate with the slider to hold it at the clip, said spring being bent in the form of a U around the lower end of the stringer with the arms of the U disposed on opposite sides of the stringer for cooperation with both wings of the slider, the inner edge of the housing being shaped to conform to the adjacent outer edge of the slider and thereby acting as a guide for the slider.

9. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring having an integral portion adapted to engage and releasably hold the slider, said clip having a socket formed at one side of the stud to receive the pin, and said clip having a housing at the opposite side of the stud to house said slider-holding spring, said housing and spring coming to a level higher than the socket so that the spring can cooperate with the slider to hold it at the clip, said spring being bent in the form of a U around the lower end of the stringer with the arms of the U disposed on opposite sides of the stringer for cooperation with both wings of the slider, said clip consisting of a single piece of metal having three collateral channels and bent to U-shape, with the middle channel clamped on the stud, the outer channel acting as the aforesaid socket, and the other outer channel acting as the aforesaid housing.

10. A fully separable slide fastener comprising stringers, a slider, and a separable bottom stop, said bottom stop comprising a stud secured to the lower end of one stringer, a pin secured to the lower end of the other stringer, a clip secured to the stud, and a slider-holding spring, said clip having a socket formed at one side of the stud to receive the pin, and said clip having a housing at the opposite side of the stud to house said slider-holding spring, said housing and spring coming to a level higher than the socket so that the spring can cooperate with the slider to hold it at the clip, said slider having detent means cooperating with the holding spring to more positively anchor the slider at the clip, said spring being bent in the form of a U around the lower end of the stringer with the arms of the U disposed on opposite sides of the stringer for cooperation with both wings of the slider, the spring housing portion of said clip having means struck inwardly and engaging a part of the spring to fix the spring in the housing, said clip consisting of a single piece of metal having three collateral channels and bent to U-shape, with the middle channel clamped on the stud, the outer channel acting as the aforesaid socket, and the other outer channel acting as the aforesaid housing, the inner edge of the housing being shaped to conform to the adjacent outer edge of the slider and thereby acting as a guide for the slider.

11. A slide fastener as defined in claim 5, in which there is a U-shaped slider-holding spring on one side of the stringer, and another U-shaped slider-holding spring on the other side of the stringer.

12. A slide fastener as defined in claim 3, in which each arm of the U-shaped spring is split to form another U-shaped spring whereby the spring has four upwardly directed collateral arms, the outer arms bearing against the housing, and the inner arms bearing against the slider when the slider is at the clip.

13. A slide fastener as defined in claim 3, in which each arm of the U-shaped spring is split to form another U-shaped spring whereby the spring has four upwardly directed collateral arms, the outer arms bearing against the housing, and the inner arms bearing against the slider when the slider is at the clip, the inner edges of the inner arms being shaped to provide projections, and the wings of the slider being shaped to cooperate with said projections to better lock the slider at the clip.

14. A slide fastener as defined in claim 8, in which each arm of the U-shaped spring is split to form another U-shaped spring whereby the spring has four upwardly directed collateral arms, the outer arms bearing against the housing, and the inner arms bearing against the slider when the slider is at the clip.

15. A slide fastener as defined in claim 9, in which each arm of the U-shaped spring is split to form another U-shaped spring whereby the spring has four upwardly directed collateral arms, the outer arms bearing against the housing, and the inner arms bearing against the slider when the slider is at the clip.

16. A slide fastener as defined in claim 10, in which each arm of the U-shaped spring is split to form another U-shaped spring whereby the spring has four upwardly directed collateral arms, the outer arms bearing against the housing, and the inner arms bearing against the slider when the slider is at the clip, the inner edges of the inner arms preferably being shaped to provide projections, and the detent means of the slider being shaped to cooperate with said projections to better lock the slider at the clip.

17. A slide fastener as defined in claim 3, in which the U-shaped spring is made of thin sheet material, each arm of the spring at its upper end being provided with fingers projecting toward the slider and disposed to bear against the slider when the slider is at the clip.

18. A slide fastener as defined in claim 3, in which the U-shaped spring is made of thin sheet material, each arm of the spring at its upper end being provided with fingers projecting toward the slider and disposed to bear against the slider when the slider is at the clip, said fingers and said slider being matingly shaped in undercut relation to better lock the slider at the clip.

19. A slide fastener as defined in claim 3, in which the U-shaped spring is made of thin sheet material, each arm of the spring at its upper end being provided with fingers projecting toward the slider and disposed to come between the wings of the slider when the slider is at the clip, said fingers having projections, and the flanges on said slider being matingly recessed to cooperate with the projections in order to better lock the slider at the clip.

20. A slide fastener as defined in claim 8, in which the U-shaped spring is made of thin sheet material, each arm of the spring at its upper end being provided with fingers projecting toward the slider and disposed to come between the wings of the slider when the slider is at the clip, said fingers having projections, and the flanges on said slider being matingly recessed to cooperate with the projections in order to better lock the slider at the clip.

21. A slide fastener as defined in claim 9, in which the U-shaped spring is made of thin sheet material, each arm of the spring at its upper end being provided with fingers projecting toward the slider and disposed to come between the wings of the slider when the slider is at the clip, said fingers having projections, and the flanges on said slider being matingly recessed to cooperate with the projections in order to better lock the slider at the clip.

OTTO J. MOEHLER.

REFERENCES CITED

The following references are of record in the file of this patent:

UNITED STATES PATENTS

| Number | Name | Date |
|---|---|---|
| 2,098,338 | Gilmore | Nov. 9, 1937 |
| 2,103,037 | Marinsky | Dec. 21, 1937 |
| 2,123,512 | Marinsky | July 12, 1938 |
| 2,123,513 | Marinsky | July 12, 1938 |
| 2,157,381 | Carille | May 9, 1939 |

FOREIGN PATENTS

| Number | Country | Date |
|---|---|---|
| 550,802 | Great Britain | of 1943 |
| 577,851 | Germany | June 6, 1933 |
| 616,470 | Germany | July 29, 1935 |
| 700,416 | France | of 1930 |
| 791,755 | France | Oct. 7, 1935 |